US006626420B2

(12) United States Patent
Amidzich

(10) Patent No.: US 6,626,420 B2
(45) Date of Patent: Sep. 30, 2003

(54) DISPENSING FAUCET FOR A PRESSURIZED SOURCE

(75) Inventor: Bradford G. Amidzich, Oconomowoc, WI (US)

(73) Assignee: Vent-Matic Company, Inc., Milwaukee, WI (US)

( * ) Notice: Subject to any disclaimer, the term of this patent is extended or adjusted under 35 U.S.C. 154(b) by 0 days.

(21) Appl. No.: 10/092,653

(22) Filed: Mar. 7, 2002

(65) Prior Publication Data

US 2003/0111629 A1 Jun. 19, 2003

Related U.S. Application Data

(63) Continuation-in-part of application No. 10/016,200, filed on Dec. 13, 2001, now Pat. No. 6,457,614.

(51) Int. Cl.[7] .................................................. F16K 31/44

(52) U.S. Cl. ......................... 251/231; 251/235; 222/509

(58) Field of Search ................................ 251/231, 235; 222/509

(56) References Cited

U.S. PATENT DOCUMENTS 733,954 A * 7/1903 Frederick .................... 137/122
1,091,552 A * 3/1914 Westerberg .................. 239/26
1,964,836 A * 7/1934 Wheaton .................... 137/156
2,057,231 A * 10/1936 Dawson ...................... 137/328
2,188,783 A * 1/1940 Voight ......................... 251/231
2,373,294 A * 4/1945 Cornelius ................... 137/600
4,742,942 A * 5/1988 Dokos et al. ............... 222/501

* cited by examiner

*Primary Examiner*—David A. Scherbel
*Assistant Examiner*—Melvin Cartagena
(74) *Attorney, Agent, or Firm*—Boyle Fredrickson Newholm Stein & Gratz S.C.

(57) ABSTRACT

A faucet comprises a valve body having a bore, an inlet port and an outlet port. A plunger is disposed in the valve body and is reciprocated in the bore. The inlet port opens into a fluid passage adapted for connection to a pressurized source, and the outlet port opens into a dispensing spigot adapted to discharge materials from the faucet. A handle having a pivotal lever is disposed in the valve body and engages the plunger to reciprocate longitudinally through the bore. A plug is mounted on the plunger and has axial and radial sealing surfaces. The plug is forced against the axial valve seat when the valve is closed to deform in both axial and radial directions. The plunger is alternatively designed with channels on its exterior and passages through its interior for use with low-viscosity fluids and with a sealing arrangement for use with high-viscosity fluids. The dispensing spigot can be removed to ease access to the plug for cleaning. The dispensing spigot can alternatively be attached via an adapter for selective placement of spigots having varied diameters.

32 Claims, 8 Drawing Sheets

DISPENSING FAUCET FOR A PRESSURIZED SOURCE

CROSS-REFERENCE TO RELATED APPLICATION

Priority is hereby claimed as a continuation-in-part on prior U.S. patent application Ser. No. 10/016,200, filed Dec. 13, 2001, now U.S. Pat. No. 6,457,614 the subject matter of which is hereby incorporated by reference in its entirety.

BACKGROUND OF THE INVENTION

1. Field of the Invention

The present invention relates to faucets for use with beer tappers and other pressurized dispensers and, more particularly, relates to a faucet configured to dispense materials in a controlled manner while minimizing bacterial contamination and simplifying cleaning of the faucet.

2. Discussion of the Related Art

Dispensing faucets are used in a variety of applications in which materials are dispensed from pressurized containers or other pressurized sources. Dispensing faucets of this type are widely used in beverage dispensing applications in which beer, soda, or another beverage is dispensed from a pressurized container such as a keg. They are also sometimes used to dispense condiments such as relish or mustard from containers under pressure. Indeed, the applications are nearly infinite.

A typical prior art faucet includes a valve operated by a pivotal lever. Specifically, a valve element is mounted on a plunger that is slidable longitudinally through a bore. When the lever is pivoted forwardly, towards the user, to open the valve element, the valve element moves rearwardly through the bore, thereby permitting dispensed materials to flow from the inlet of the valve to the outlet. The entire valve is exposed to flowing fluid during dispensation, but when the valve is not dispensing, major portions of wet valve elements are exposed to air. In addition, fluid that collects in the front portion of the valve must be drained from the valve through a drain bore. Standing fluid in the valve and exposure of the wet valve elements to air can give rise to undesirable bacterial growth within the valve. Therefore, the need has arisen to improve the design of a faucet to eliminate air from the interior of the valve.

Another problem associated with conventional faucets is that they do not incorporate features allowing sanitary dispensation of particulate matter. As a result, if used to dispense viscous fluids or particulate-laden materials, such as mustard or relish, residues of the dispensed materials remain on the valve element after the dispensing operation, and bacteria may grow on the residual materials on the valve element, risking contamination of the dispensed materials during subsequent dispensing operations. Traditional tapper type dispensing faucets are therefore rarely used to dispense flowable materials such as condiments or other viscous or particulate-laden fluids. The need therefore has arisen to provide a dispensing faucet that incorporates measures to wipe the faucet's valve element clean of dispensed fluid during the dispensing operation.

Traditional faucets also require a fairly elaborate method for cleaning the valve elements, including taking the valve elements out of the valve body and washing them at another location. The need has arisen to not only provide valve elements that remain clean, but that also provide valve elements which can be cleaned effectively without disassembling the valve.

SUMMARY OF THE INVENTION

Pursuant to the invention, a dispensing faucet is provided with a number of advantages. The interior of the valve does not contain air. The valve element may also be configured to be wiped clean of dispensed materials when it is driven by the handle. The spigot at the outlet of the valve may also be removable for easy access to the valve element.

In accordance with a first aspect of the invention, the valve seal is provided at the outlet of the valve rather than the inlet, so that all of the valve elements are immersed in fluid at all times.

In accordance with another aspect of the invention, the plunger of the valve is configured to encourage fluid to wash over it freely.

In accordance with yet another aspect of the invention, a food-grade lubricant is sealed within a structure to prevent air from entering the valve through the lever of the handle.

In accordance with another aspect of the invention, which is not necessarily mutually exclusive with the other aspects, a rib may be molded within the valve to create a wiping action when opening and closing the valve.

In accordance with still another aspect of the invention, again not necessarily mutually exclusive with the other aspects, an adaptor and removable spigot are provided. These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, with corresponding parts in different embodiments designated by multiples of 100, and in which.

DETAILED DESCRIPTION OF THE PREFERRED EMBODIMENTS

1. Resume

A dispensing faucet is provided that is usable in any system in which a faucet is selectively operated to dispense materials from a pressurized source. For instance, it is applicable to "tapper" faucets configured to dispense beer or another pressurized liquid from a keg or another pressurized container. It is also applicable to condiment faucets configured to dispense mustard or relish from a can. For the purposes of describing this invention, both non-viscous and viscous materials, such as beer and hot dog relish, shall be considered fluids or liquids.

The faucet comprises a valve body and a plunger which is mounted in a bore in the valve body for reciprocating movement therein. The bore has an inlet port that opens into a passage adapted for connection to a pressurized container or other source of pressurized fluid, and an outlet port that opens into a dispensing spout or spigot adapted to deliver materials from the faucet. A handle having a pivotal lever is disposed in the valve body and terminates in a socket of the plunger. The lever thus engages the plunger to drive the plunger to reciprocate longitudinally through the bore. A plug on the plunger controls flow through the valve. In a first embodiment of the invention, the interior and exterior of the plunger are designed to allow fluid to easily pass through and around the plunger. In a second embodiment of the invention, a seal is provided between the plunger and the lever for keeping fluid out of the plunger socket. In a third embodiment, an adapter is provided at the outlet for removing the spigot to easily clean the plug. In fourth, fifth, and sixth embodiments, the plunger is also constructed with a nose, or tip, downstream from the plug.

2. Construction and Operation of First Embodiment

Figure 2:
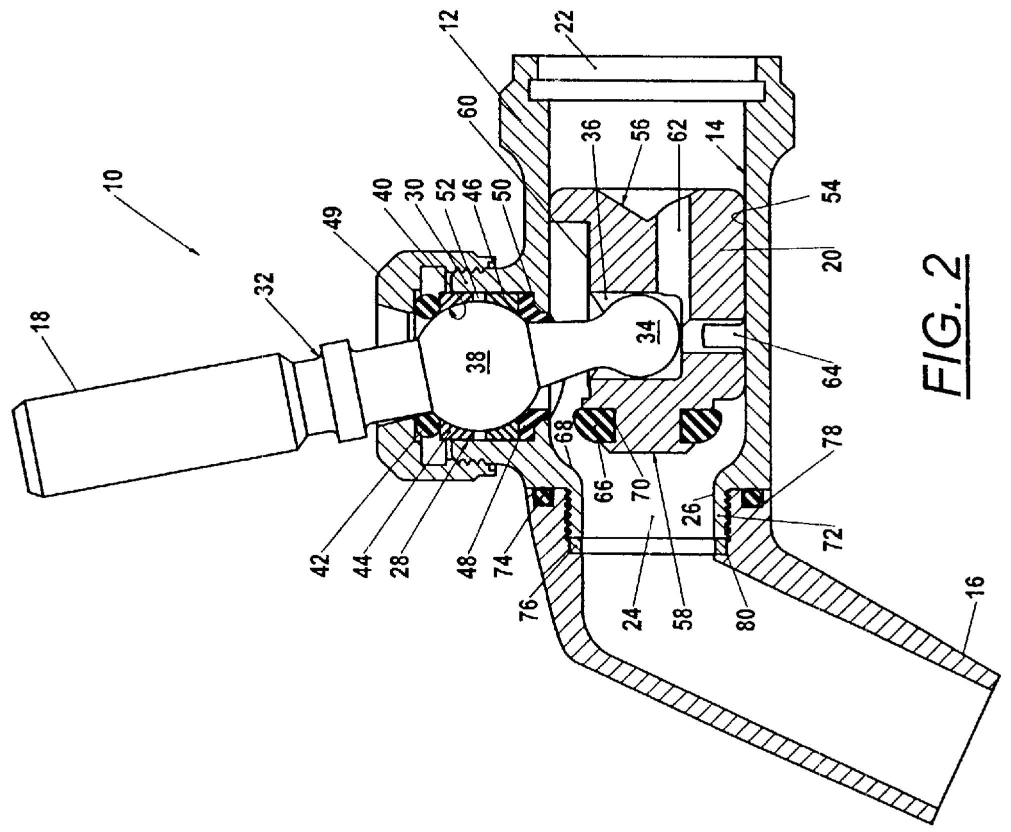
FIG. 2 corresponds to FIG. 1 and illustrates the valve in a partially open position.
Figure 1:
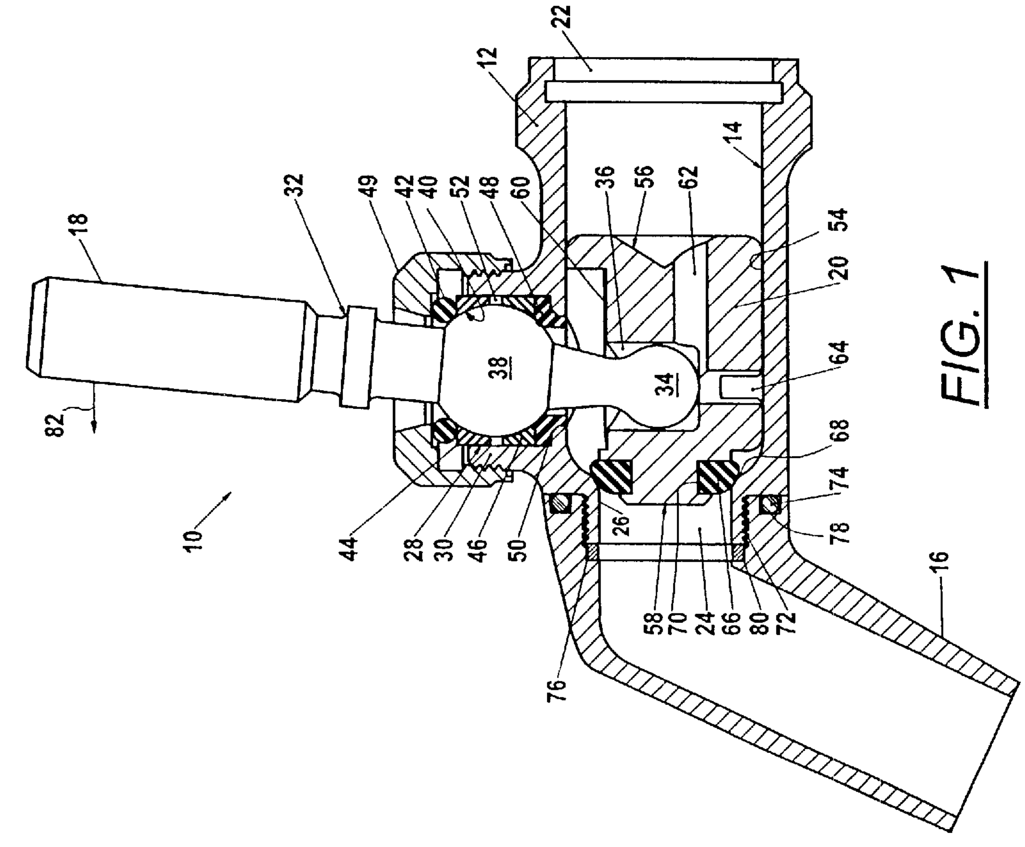
FIG. 1 is a partially sectional side elevation view of a dispensing faucet constructed in accordance with a first preferred embodiment of the present invention and illustrating a valve thereof in its closed position.
Figure 3:
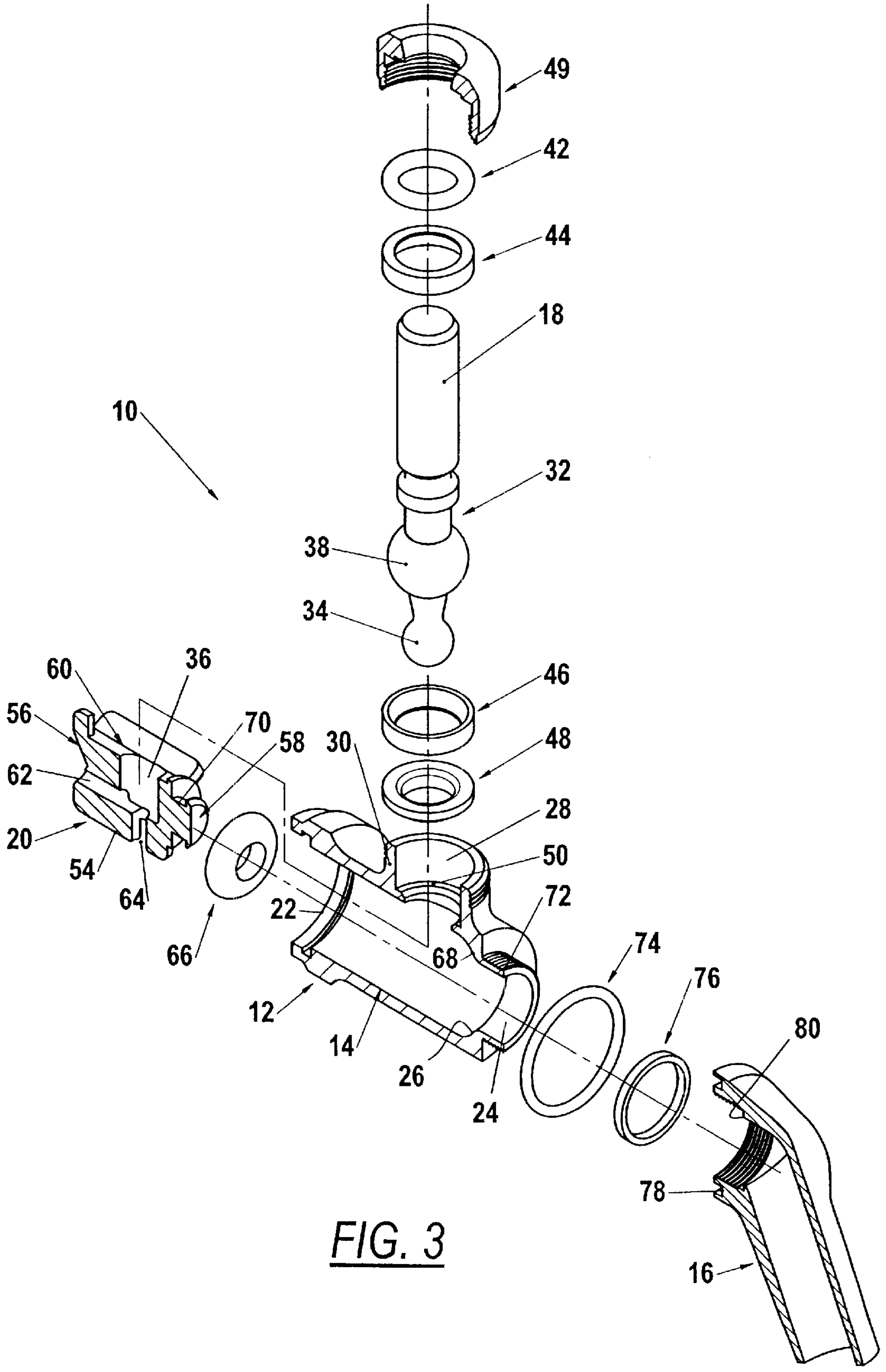
FIG. 3 is an exploded perspective view of the faucet of FIG. 1.

Referring to FIGS. 1–3, a faucet 10 constructed in accordance with a first embodiment of the invention includes a valve body 12 having a bore 14 within it, a spigot 16 that is mounted on the valve body 12, and a handle 18 that is operable by an operator to translate a plunger 20 within the bore 14 to open the faucet 10 and dispense fluids through the spigot 16.

The valve body 12 may be formed from any material capable of slidably receiving the plunger and of pivotably supporting the handle. It preferably is formed from a food-grade plastic or another moldable material. The bore 14, which is essentially cylindrical in shape, is formed axially through the valve body. An inlet port 22 is formed in an upstream axial end of the bore 14 for connecting the faucet 10 to a pressurized fluid container (not shown). An outlet port 24 is formed in the opposite end of the bore 14 for delivering dispensed materials to the spigot 16. A valve 26 is located at a reduced-diameter portion of the bore 14 located adjacent or at the outlet port 24. Another bore 28 extends radially from the bore 14, through a boss 30 on the upper surface of the valve body 12, and to the outer surface of the valve body 12 for receiving the handle 18.

The lower end of the handle 18 forms a pivotal lever 32 that terminates in a ball 34 mounted in a socket 36 of the plunger 20. The lever 32 is also pivotally mounted in the second bore 28 by a pivot mount, preferably formed from a second ball 38 and a socket 40. Both balls 34 and 38 are preferably molded integrally with the lever 32. The lower socket 40 preferably is formed from a simple bore in the plunger 20. The upper socket 40 is formed from an upper O-ring 42, an upper bushing 44, a lower bushing 46, and another O-ring 48. The assembly is held in place by an end-cap 49 threaded onto the boss 30 so as to clamp the O-ring 42 between the end-cap 49 and the ball 38. The upper sealing ring 42 provides a barrier between the fluid in the bore 14 and the interior of the pivot mount. It is shaped generally in the shape of an inverted L when viewed in transverse cross section so as to seal against the ball 38 at the apex of the L and to seal against both axial and radial surfaces of a lower shoulder 50 in the bore 28 at the legs of the L. The bushings 44 and 46 surround the ball 38 so as to provide primary support for the lever 32. The bushings 44 and 46 do not meet directly, but together with the ball 38, encase a quantity of food-grade lubricant 52. This arrangement provides a number of advantages. First, the lubricant 52 lubricates the lever 32 within the bushings 44 and 46 to provide smooth movement of the lever 32. Second, the lubricant 52 provides a high-viscosity barrier against the admission of air into the bore 14. Finally, the manner in which the lubricant 52 is captured between the bushings 44 and 46 and provides both of the above advantages of having food-grade lubricant without fear that it will become intermingled with the fluid being dispensed.

The plunger 22 comprises a generally cylindrical molded member slidably mounted in the bore 14. It includes an outer peripheral surface 54 and upstream and downstream axial ends 56, 58. The above-described socket 36 extends radially into the plunger 20 between the ends 56 and 58. The entire plunger 20 is arranged within the bore 14 such that, unlike prior art faucets, nearly the entire plunger 20 is always immersed in the liquid being dispensed, even when the faucet 10 is not in use. This is advantageous because no part located within the bore 14 is exposed to air when constantly surrounded by fluid.

The plunger 20 of this embodiment is contemplated for use with a non-viscous fluid, such as beer or another beverage. The plunger 20 is therefore configured to facilitate fluid flow through and past the plunger and the interface between the plunger 20 and the lever 32 so that the plunger 20 is washed clean of any particulate matter during dispensing. Towards this end, channels 60 are formed on its peripheral surface to provide a fluted appearance, and passages 62, 64 extend from the socket 36 to upstream axial end 50 and the lower radial surface of the plunger 20, respectively. The passages 62 and 64 allow the fluid being dispensed to wash over the interior of the plunger 20, including its radial socket 36. Likewise, the channels 60 provide for fluid motion around the plunger 20.

A seal 66 is mounted on the downstream end portion of the plunger 20 for sealing against a valve seat 68 on the valve body 12 when the plunger 20 is in the valve-closed position of FIG. 1. The seal 66 is made of a deformable elastomeric O-ring (on the order of 70–90 durometer) that fits snugly in a groove 70 on the outer surface of the plunger 20. The seal 66 is preferably D-shaped when viewed in transverse cross section so as to present a relatively large mass for pressing against the valve seat 68. The mating surface of the valve seat 68 has a curved shape that generally complements the curvature of the seal 66. Because the seal 66 is highly deformable, it compresses axially and expands radially against the valve seat 68 to seal over a relatively large area, thereby providing a remarkably effective seal. The dual compression of the seal 66 also inhibits bacterial growth in the faucet 10 by preventing air and liquid flow through the outlet port 24 when the faucet 10 is closed.

The spigot 16 is removably mounted on the downstream end of the valve body 22, preferably by being threaded onto a threaded boss 72 extending downstream from the downstream end of the valve body 12. The spigot 16 is sealed against the valve body 12 by a pair of O-rings 74, 76, one of which mounted in a groove 78 on the upstream axial end of the spigot 16 and the other of which is clamped between the end of the boss 72 and a step 80 in the spigot 16. Due to this rotation relationship, removal of the spigot 16 renders all components of the faucet 10 that are exposed to fluid but not permanently immersed in it (namely, the valve seat 68, the downstream end 58 of the plunger 20, the end of the seal 66, and the interior of the boss 72) accessible for easy cleaning by a simple swab or sprayer.

In use, an operator opens the faucet 10 by moving the handle 18 in the direction of the arrow 82 in FIG. 2 from the position illustrated in FIG. 1 to the position illustrated in FIG. 2. This movement drives the lever 32 to pivot about its mount 40 to drive the plunger 20 within the bore 14 to the position of FIG. 2. The seal 66 moves away from the valve seat 68 at this time, permitting fluid to flow out of the bore 14 and through the spigot 16. Fluid flows over, past, and through the plunger 20 at this time through the channels 60 and passages 62, 64, thereby washing the interior and exterior surfaces of the plunger 20 free from contaminants. When the operator wishes to cease dispensing, he or she simply pushes the handle 18 back to the position of FIG. 1, thereby driving the plunger 20 to a position in which the seal 66 deforms against the valve seat 68 to close the faucet 10. The portions of the faucet 10 that are exposed to air can be periodically cleaned simply by removing the spigot 16 and cleaning those portions with a swab or a sprayer.

3. Construction and Operation of Second Embodiment

Figure 4:
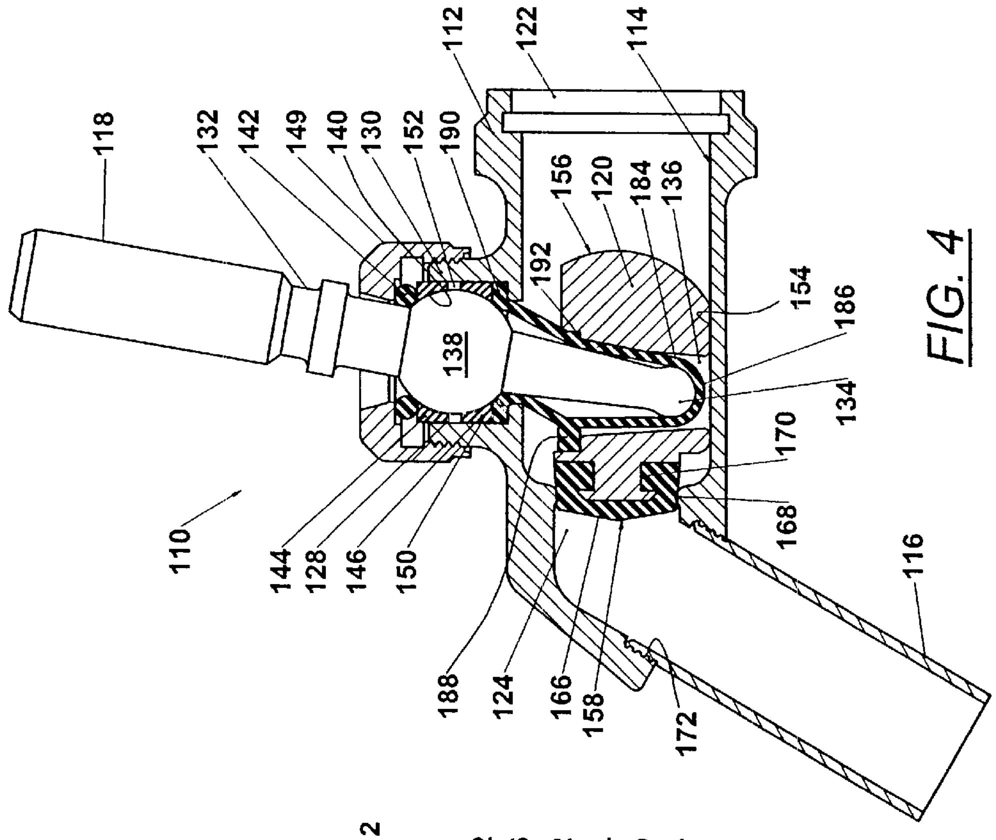
FIG. 4 is a partially sectional side elevation view of a dispensing faucet constructed in accordance with a second preferred embodiment of the present invention and illustrating a valve thereof in its closed position.
Figure 5:
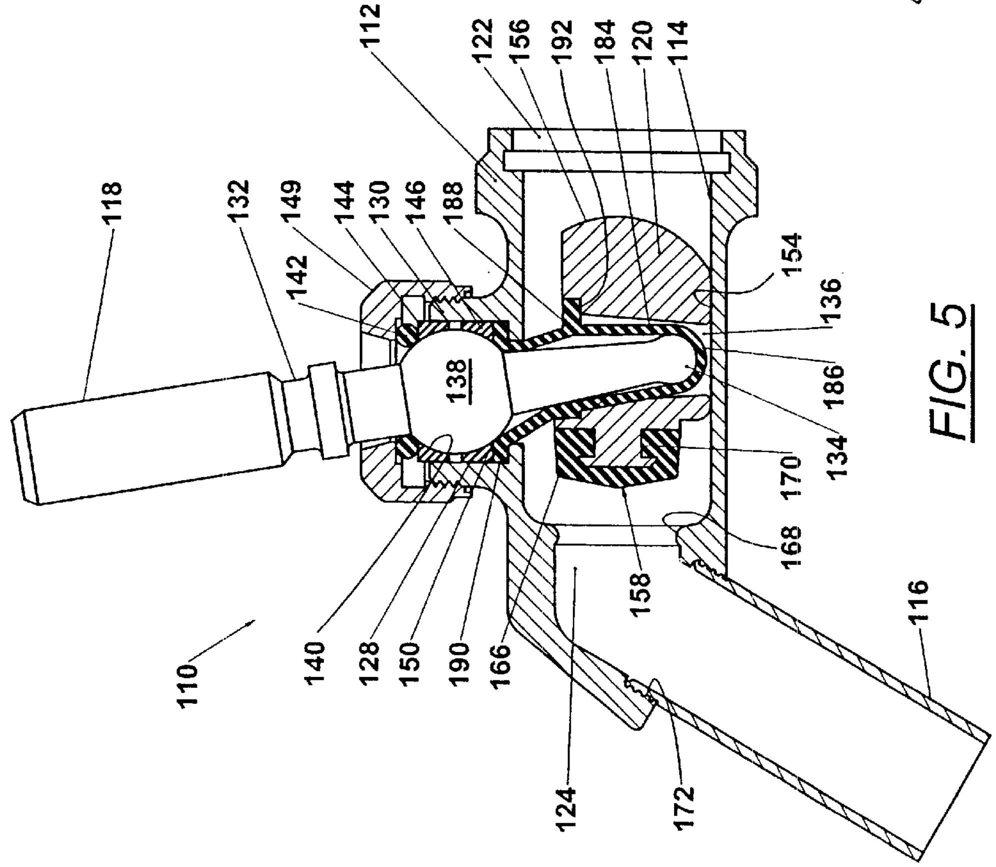
FIG. 5 corresponds to FIG. 4 and illustrates the valve in a fully open position.
Figure 6:
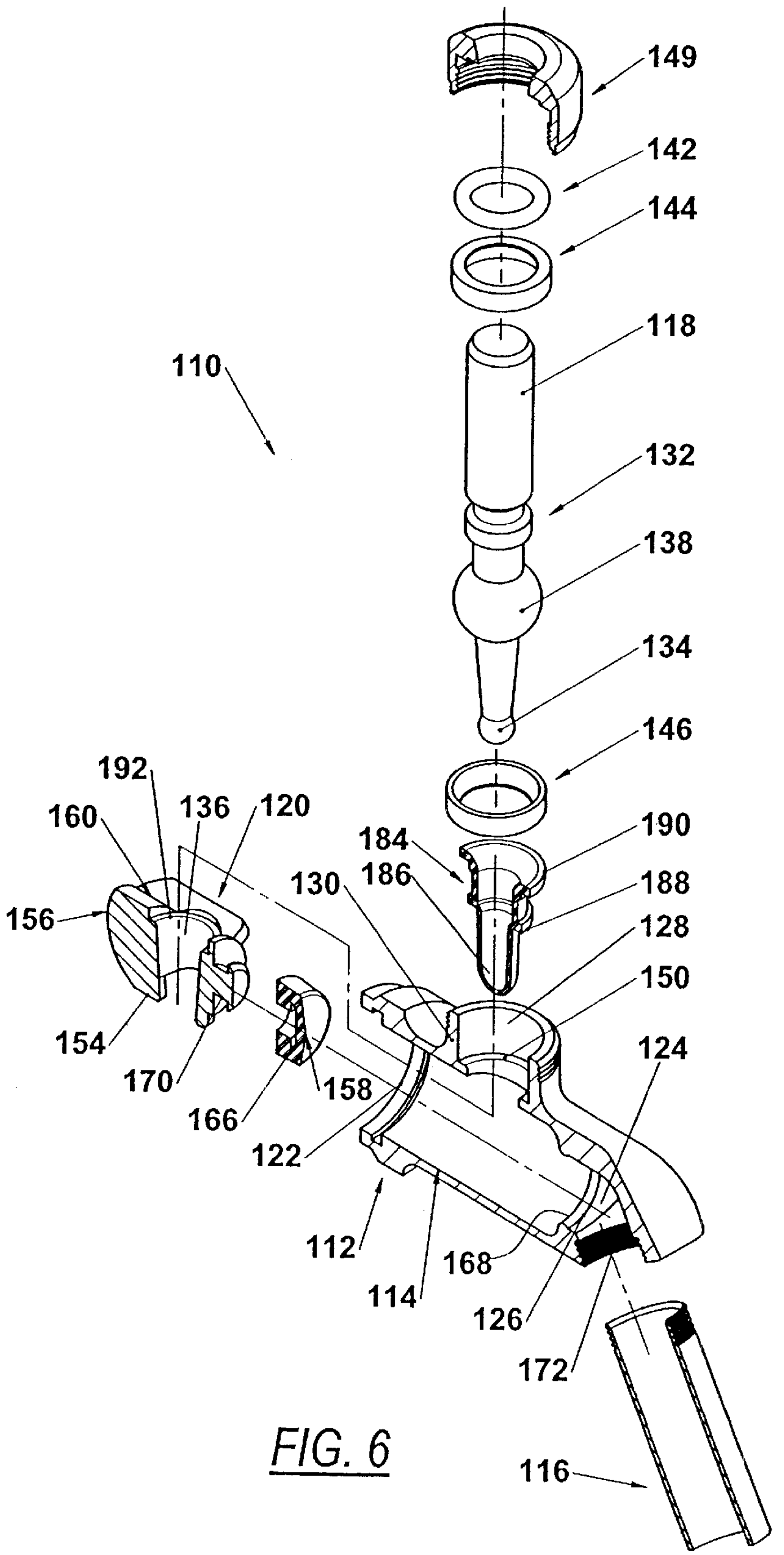
FIG. 6 is an exploded perspective view of the faucet of FIG. 4.

Referring now to FIGS. 4–6, a second embodiment 110 of the invention is illustrated which is well-suited for use with viscous and/or particulate laden fluids, such as condiments. Several of its components therefore are modified to obtain more ideal anti-bacterial dispensing of those fluids. However, it should be emphasized that faucets 10 and 110 may be used interchangeably for either viscous or non-viscous fluid dispensation, and faucet 110 has many of the same components as faucet 10 and shares many of the same beneficial characteristics. In order to reflect this similarity, parts of this embodiment that correspond to parts of the first embodiment are designated by the same reference numerals, incremented by 100. Faucet 110 therefore includes a valve body 112, axial and radial bores 114 and 128, an inlet port 122, and an outlet port 124 having a valve seat 168. As before, the bore 114 contains a plunger 120 with a valve seal 166 attached at the outlet end of the plunger 120. The handle 118, pivotal lever 132, pivot ball 138, and receiving radial socket 140 (including the O-ring 142, bushings 144 and 146, grease 152, and cap 149) are also the same as in the previous embodiment. The spigot 116 is also detachably mounted on a threaded boss 172 of the valve body 112 as in the first embodiment.

Because viscous fluids must be pushed through narrow areas rather than flowing freely, the plunger 120 of this embodiment does not feature the channels and passages of the prior embodiment, but rather is configured to prevent viscous fluid from entering crevices where it can be trapped. The plunger 120 is otherwise of generally the same construction as the plunger of the first embodiment, including upstream and downstream axial ends 156, 158, outer peripheral surface 154, and radial socket 136 for receiving the lower ball 134 of the lever 132. However, in order to accommodate a boot 184 (detailed below), the socket 136 is deeper than the corresponding socket of the first embodiment and may even be formed from a simple through-bore as illustrated. In addition, the front axial end 156 is preferably rounded when viewed in transverse cross-section to facilitate the flow of viscous fluids past the plunger 120.

In order to prevent fluid from entering the socket 136, the connection between the pivotal lever 132 and the socket 136 is protected by a guard or boot 184. The boot 184 is designed so as to completely isolate the lever 132 from the valve body 112 and to perform the functions of the sealing ring of the first embodiment. It is preferably a flexible food-grade elastomeric material and is preferably molded as a single piece. It completely covers the portion of the lever 132 extending downward from the pivot mount 138, 140. The guard 184 has a lower cup portion 186 receiving the terminal end of the lever 132, a center sealing lip 188 covering the socket 136, and an upper sealing flange 190. The upper sealing flange 190 is the same shape and performs the same functions as the sealing ring of the first embodiment. The center sealing lip 188 seals against a shoulder 192 formed from a counterbore in the outer radial surface of the plunger 120. The cup portion 186 is dimensioned relative to the lever 132 such that, upon faucet assembly, the bottommost end of the lever 132 engages and distorts the bottom end of the cup portion 186, thereby pulling the center sealing lip 188 into tight sealing engagement with the shoulder 192 on the plunger 120. The deformation becomes greater when the handle 118 is pivoted to open the faucet 110, thereby pulling the center sealing lip 188 even more tightly against the plunger 120 and preventing fluid from entering the socket 136 during the pivoting movement of the lever 132. While a unitary guard 184 is disclosed in the preferred embodiment, it should be understood that the sealing functions of the guard 184 could be duplicated with a pair or series of sealing rings and related structures.

Other modifications that can be made to facilitate a cleaner dispensing process when using the faucet 110 of the present invention with viscous fluids include a valve seal 166 of a different shape and the addition of an annular rib at the valve seat 168. As seen in the drawings, the valve seal 166 can be a cap-like seal having a longer axial surface than the ring-shaped seal of the first embodiment. The annular rib 168 is preferably integrally molded with the valve body 112. The modification of the seal 166 and the addition of the rib 168 provides the advantage of wiping the seal 166 clean along with providing the sealing function, discussed supra. Specifically, as the plunger 120 is pushed toward or away from the seat 168, the sides of the seal 166 scrape against the rib 168. Dispensed materials are thus pushed out of the faucet 110, while undispensed materials are scraped upstream. The axial sealing engagement of the elastomer seal 166 against the rib 168 therefore prevents materials from ever being anywhere but on one side or the other of the rib 168. Undispensed materials remain out of contact with the air, minimizing the potential for microbial growth. Meanwhile, the radial sealing engagement of the elastomer seal 166 prevents leakage of air or fluid into or out of the faucet 110.

Another advantage of the seal 166 of this embodiment is that, like the prior embodiment, because the seal 166 is engaged at the outlet port 124 and is easily accessible upon removal of the spigot 116, excess condiment or other dispensed fluid can easily be wiped from the seal 166 after unthreading the spigot 116 from the valve body 112.

4. Construction and Operation of Third Embodiment

Figure 7:
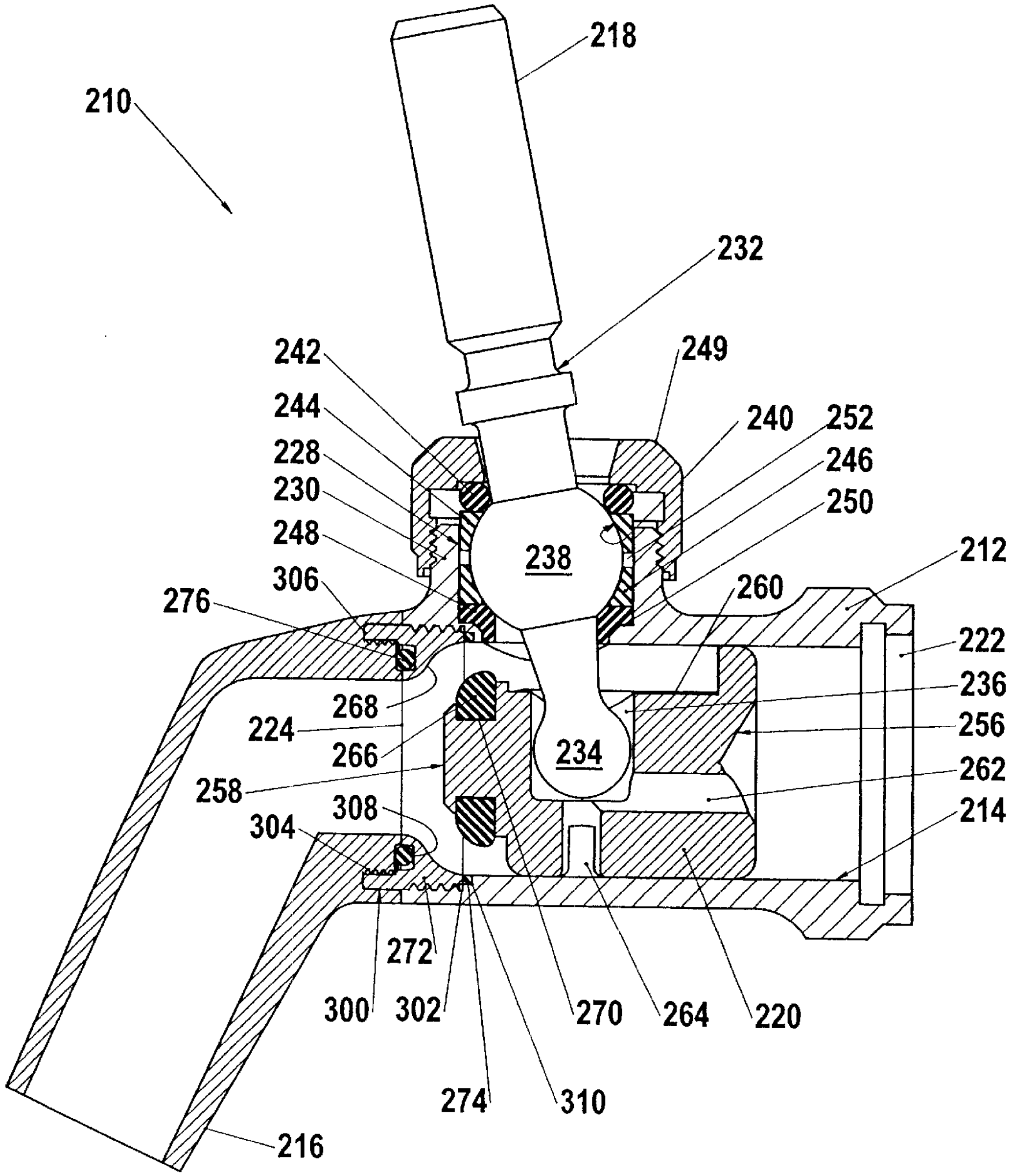
FIG. 7 is a partially sectional side elevation view of a dispensing faucet constructed in accordance with a third preferred embodiment of the present invention and illustrating a valve thereof in a fully open position.
Figure 8:
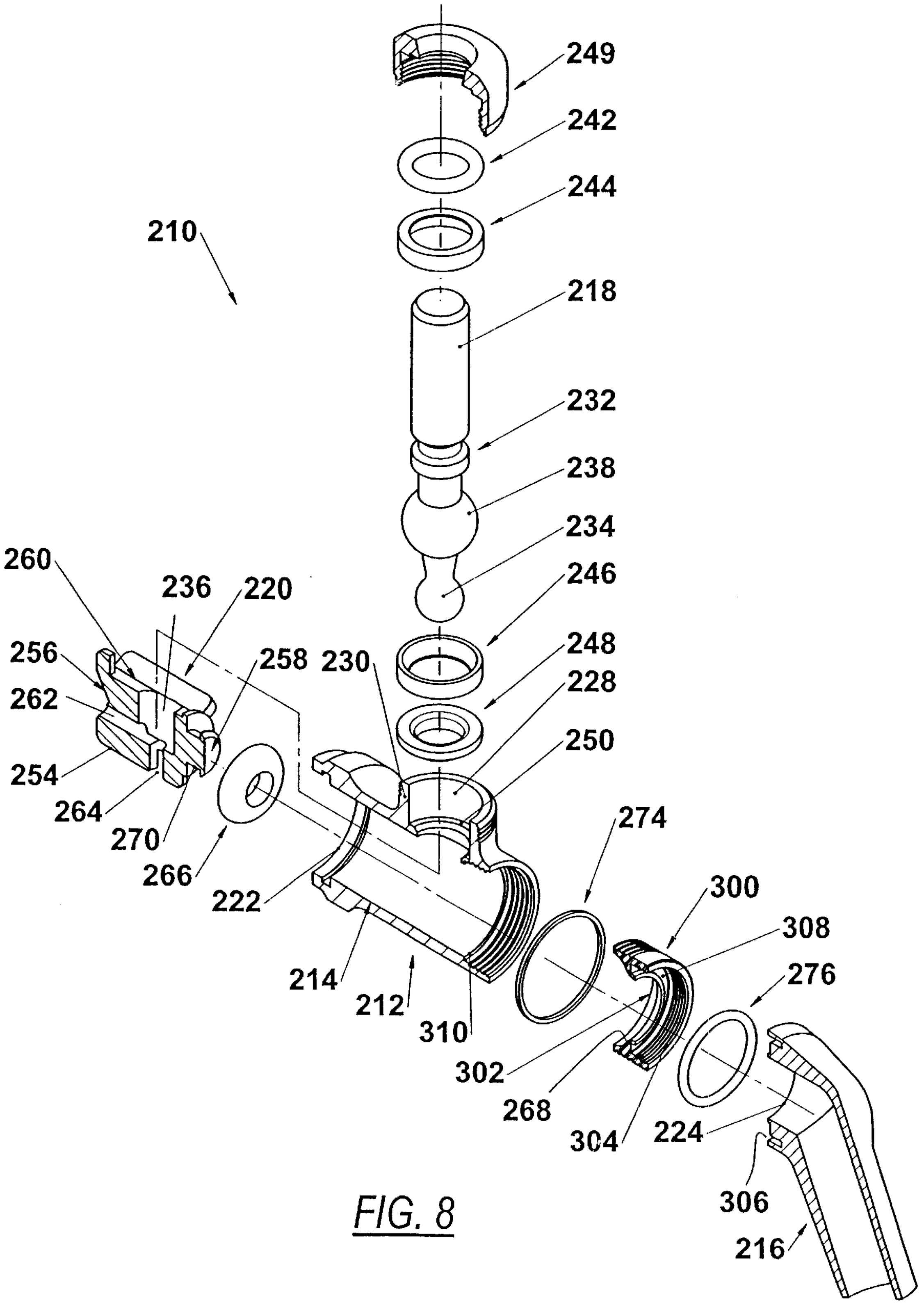
FIG. 8 is an exploded perspective view of the faucet of FIG. 7.

Referring now to FIGS. 7 and 8, a third embodiment is illustrated, which may be used in conjunction with either of the other two embodiments. The faucet 210 therefore has many of the same components as faucet 10, and reference numbers are incremented by 200 to reflect corresponding parts. Faucet 210 therefore comprises a valve body 212 having a bore 214. At either end of the bore 214 are an inlet port 222 and an outlet port 224. The plunger 220, handle 218, lever 232, and pivot mounts 234, 236, 238, etc., are all identical to the corresponding components of the first embodiment. In fact, the primary difference between the faucet 210 of this embodiment and the faucet 10 of the first embodiment is that it is configured to accept spigots of different diameters, thereby permitting the dispensing of fluids at different rates for a given pressure.

Specifically, as shown in FIGS. 7 and 8, the outlet port 224 features a spigot adapter 300 that is connectible with the valve body 212 and the spigot 216. The adapter 300 comprises a ring having an externally threaded upstream end portion 302 and externally threaded downstream end portion 304. The threads on the upstream end portion 302 mate with corresponding threads on the inner periphery of the downstream end of the valve body 212. The threads on the downstream end portion 304 mate with corresponding threads in a groove 306 formed in the axial end of the spigot 216. The inner periphery of the adapter 300 is stepped approximately midpoint of the adapted to present an annular surface 308 against which the spigot 216 abuts. The spigot 216 is sealed to the adapter 300 at the surface 308 via first O-ring 276, and the upstream end 302 of the adapter 300 is sealed against a shoulder 310 of the valve body 212 by another O-ring 274, thereby providing a fluid-tight flow path for the dispensing of fluid through the spigot 216. Finally, a valve seat 268 that is identical to the valve seat of the first embodiment is formed on the inner periphery of the adapter 300 upstream from the surface 308.

It should be apparent from the above that the adapter 300 permits the spigot 216 and adapter 300 to be removed and replaced by a different spigot and adapter arrangement having a different minimum bore diameter (formed by the diameter of the valve seat and the corresponding diameter of the bore in the spigot), thereby configuring the faucet 210 for dispensing fluid at a different rate.

5. Construction and Operation of Fourth, Fifth, and Sixth Embodiments

Turning now to FIGS. 9–12, three additional embodiments of the faucet are illustrated. The embodiments of FIGS. 9–12 are primarily directed toward the dispensation of carbonated beverages. However, it should be noted once more that none of the embodiments is mutually exclusive; the elements of each can be variously combined as desired for a use in a variety of applications. The faucets of the embodiments of FIGS. 9–12 differ from that of the third embodiment of FIGS. 7 and 8 only in that a tip or is provided on the downstream end of the plunger. Providing a tip or nose at this location can produce a distinct advantage when the liquid to be dispensed is carbonated.

Specifically, it has been discovered that liquid falling vertically through the spigot is accelerated by gravity relative to the horizontally-flowing liquid exiting the valve. As a result, a pressure differential can form between a lower pressure region in uppermost portion of the faucet and a higher pressure region in the spigot, trapping a pocket of air in the horizontal portion just downstream of the plunger. At relatively high dispensing rates (on the order of over 1 gallon per minute and higher), forced liquid flow through the trapped air pocket can cause enough disruption in the fluid to separate the $CO_2$ from a carbonated liquid. The release of $CO_2$ in the outlet can lead to substandard pouring of a beverage due to excessive foam in the spigot and can adversely affect the quality of the dispensed beverage. It has been found that a tip in the end of the plunger prevents the $CO_2$ from separating from the dispensed. beverage for reasons detailed below. The optimal shape and extent of the tip may vary from application to application depending on, for example, the $CO_2$ content of the liquid being dispensed, the volumetric flow rate of the dispensed liquid, the throw of the handle, etc.

In each of these embodiments, a tip 600, 700, 800 is provided on the end of the associated plunger 320, 420, 520 so as to extend past the valve seat even when the valve is in its open position. The tip of each embodiment may be formed from the same material as the associated plunger and is preferably formed integrally with the associated plunger. All of the remaining components of each of these embodiments, including the remainder of the plunger 320, 420, 520, the seal 366, 466, 566, and the handle 318, 418, and 518 are identical to the corresponding components of the third embodiment. The components of each of these embodiments corresponding to components of the immediately preceding embodiments are, therefore, designated by the same reference numerals, incremented by 100.

Figure 10:
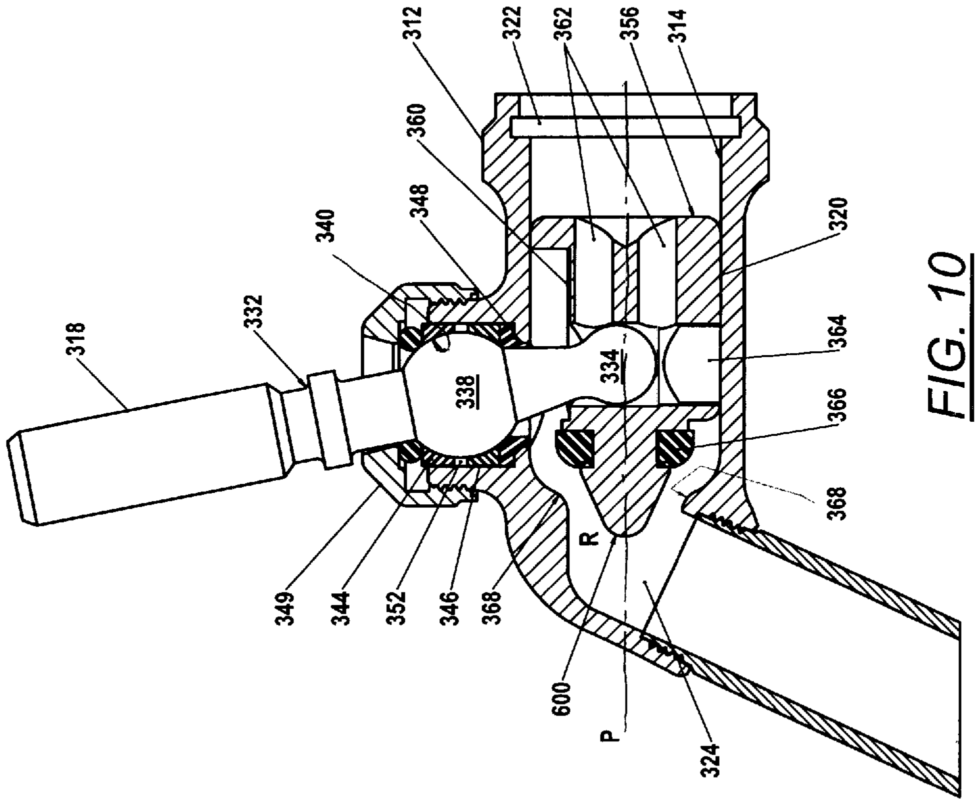
FIG. 10 corresponds to FIG. 9 and illustrates the valve in a fully open position.
Figure 9:
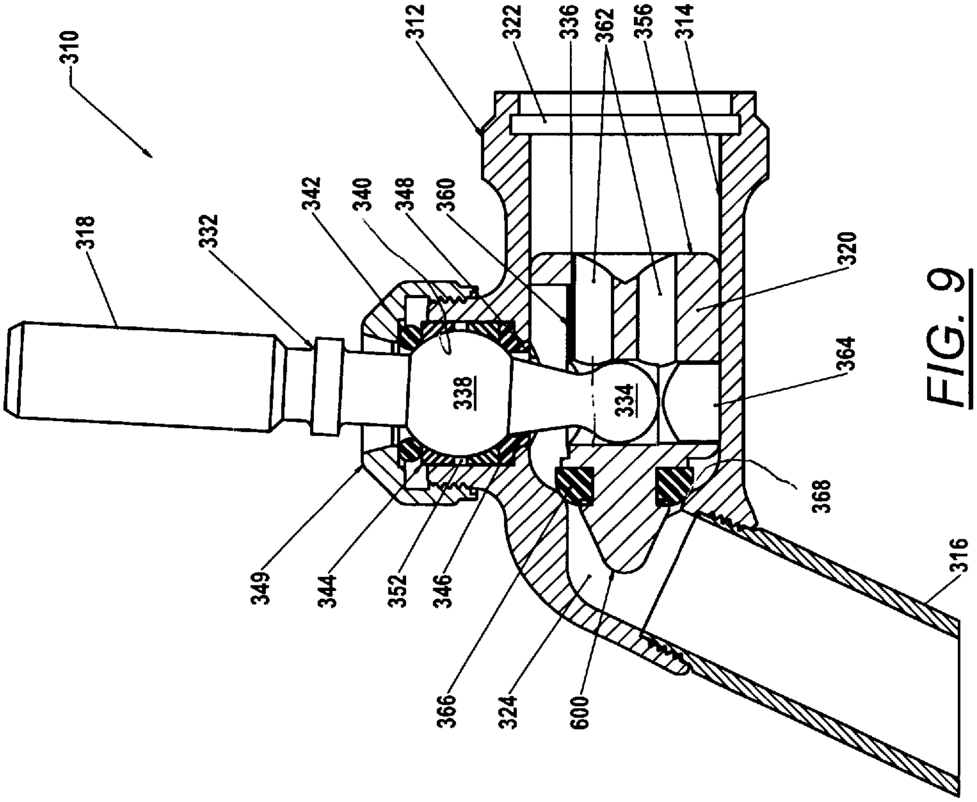
FIG. 9 is a partially sectional side elevation view of a dispensing faucet constructed in accordance with a fourth preferred embodiment and illustrating a valve thereof in its closed position.

Turning first to FIGS. 9 and 10, a tip 600 is formed on the downstream end of plunger 320 of a faucet 310 so as to extend past the valve seat 368 by a substantial distance even when the valve is in the open position. The tip 600 is configured to effect a relatively large pressure increase in what would otherwise be the low pressure region R of the faucet and, therefore, is well-suited for use in low flow rate applications on the order of, e.g., less than 1 gal/min (assuming that all other factors affecting foaming are equal and/or not of concern to the designer). Specifically, the tip 600 is conical, has a relatively wide base at its upstream end, and is relatively long. Due to the presence of the tip 600, the pressure differential across the plane P is reduced significantly to allow the air to be evacuated from the valve by liquid flowing out of the valve. The dispensed liquid is able to flow and out of the outlet 324 of the faucet 310 without allowing $CO_2$ to break out.

Figure 11:
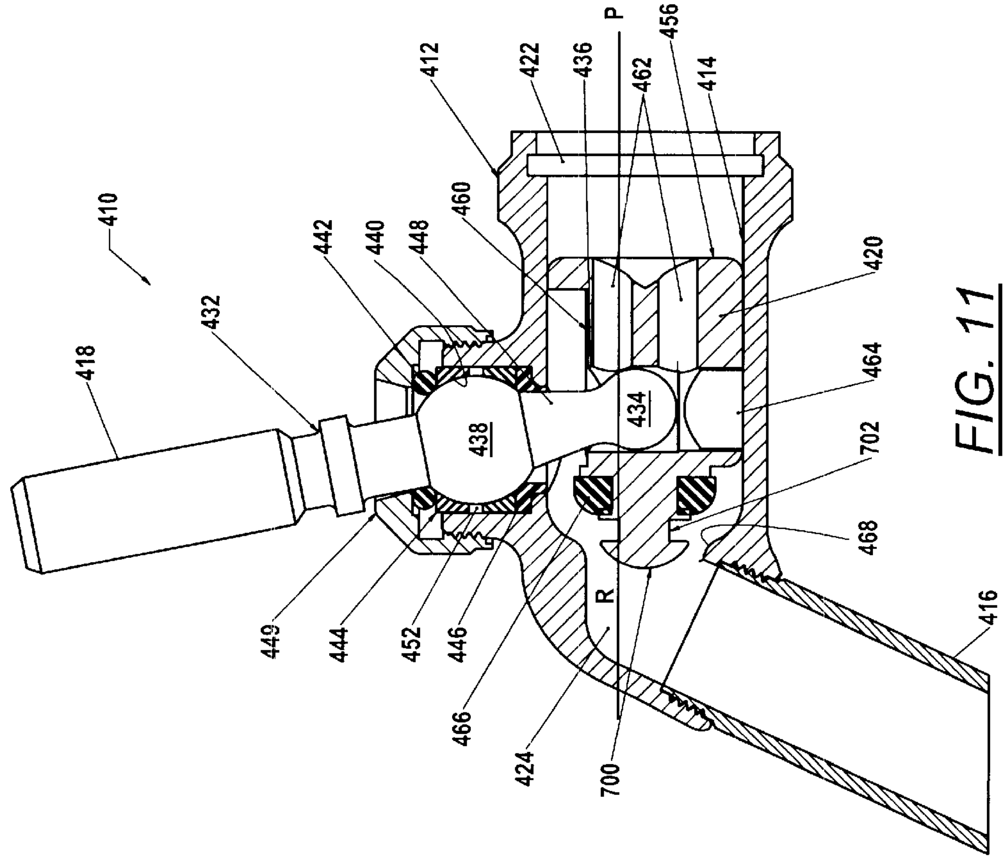
FIG. 11 is a partially sectional side elevation view of a dispensing faucet constructed in accordance with a fifth preferred embodiment and also illustrating a valve thereof in its open position.

The embodiment of FIG. 11 differs from the embodiment of FIGS. 9 and 10 only in that its tip 700 is somewhat bulbous in shape and has an annular groove 702 cut in its outer periphery. The bulbous tip 700 does not extend as far into the outlet 424 as tip 600 of FIGS. 9 and 10. In addition, the groove 702 is positioned so as to be essentially coplanar with the valve seat 468 when the valve is in the open position of FIG. 11, increasing the flow area at the throat of the valve and also imparting directional changes to liquid flowing through the throat.

Figure 12:
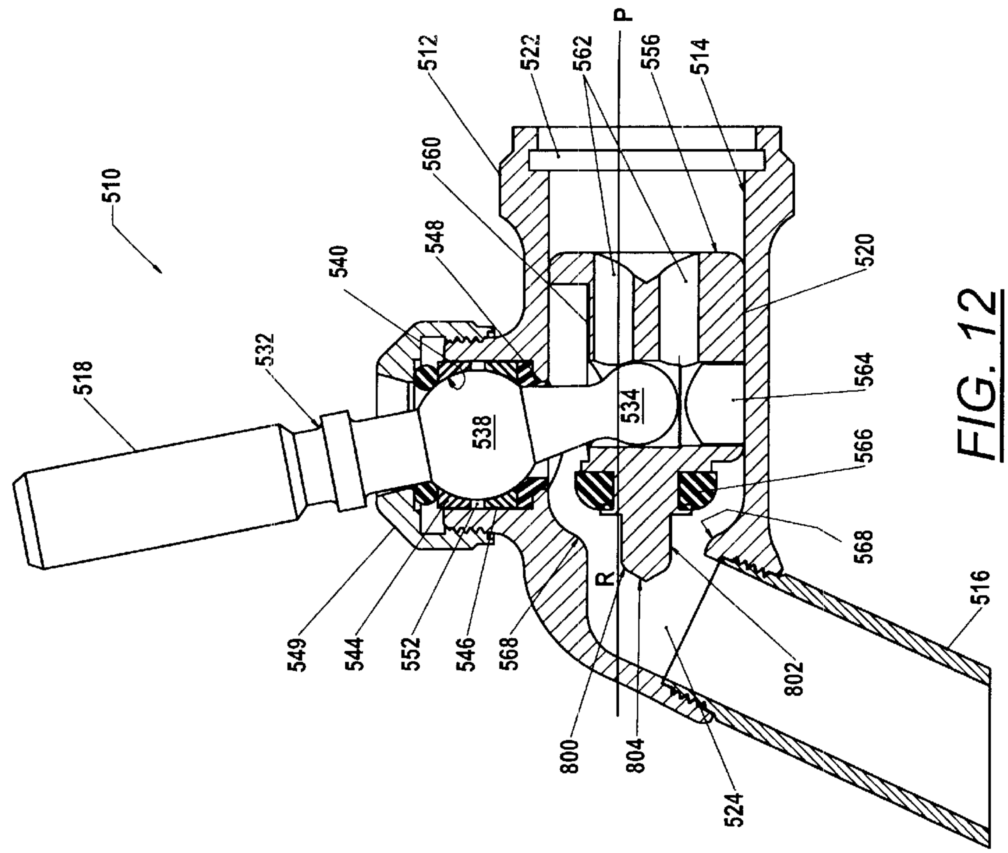
FIG. 12 is a partially sectional side elevation view of a dispensing faucet constructed in accordance with yet a sixth preferred embodiment and again illustrating a valve thereof in its open position.

The embodiment of FIG. 12 features a tip 800 that provides a lower pressure increase in the region R than the tip 600 of FIGS. 9 and 10. The tip 800 is commensurate in length with the tip 600 but has a cylindrical upstream end portion 802 and a conical downstream end 804. The cylindrical portion 802 has a considerably smaller diameter than the base of the tip 600 of the embodiment of FIGS. 9 and 10. Providing a tip on the plunger retains the advantages of sanitary fluid flow and ease in cleaning as previously discussed, yet also prevents the fluid disruption that can cause $CO_2$ release. It is also possible to change the shape of the outlet so that it provides a smaller area into which the liquid is dispensed, however that solution would not provide the option of using different tips to provide different flow rates as desired.

While the present invention has been described and illustrated in connection with preferred embodiments, the scope thereof is not to be limited by such description and illustration, but is to be limited solely by the scope of the claims, which follow. Certain equivalents will also appear to those skilled in the art, all of which are deemed to be within the scope of the present invention.

I claim:

1. A faucet comprising:

(A) a valve body having a bore, an inlet port, an outlet port, and a seat disposed adjacent said outlet port;

(B) a plunger disposed in said valve body between said inlet port and said outlet port, wherein said plunger has a first, upstream end and a second, downstream end, wherein said plunger is moveable axially within said bore, in a direction parallel to fluid flow, from a valve-open position to a valve-closed position, and wherein said plunger has a flow modifying tip on its downstream end that extends at least partially into said outlet port when the plunger is in said valve-open position; and (C) a valve seal disposed adjacent to said downstream end of said plunger, wherein said seal seals against said seat when said plunger is in said valve-closed position.

2. The faucet as recited in claim 1, wherein said inlet port opens into a fluid passage adapted for connection to a pressurized material source, and further comprising a dispensing spigot located downstream from said outlet port and adapted to discharge fluid from said faucet.

3. The faucet as recited in claim 2, wherein said dispensing spigot is selectively removable from said valve body to permit cleaning of said seat and said seal.

4. The faucet as recited in claim 3, further comprising an adapter via which said spigot is mounted on said valve body, said adapter being configured to permit replacement of said spigot with another spigot of a different diameter than said spigot, thereby reconfiguring said faucet to dispense fluid at a different rate.

5. The faucet as recited in claim 1, wherein said plunger is at least essentially entirely immersed in fluid during fluid dispensation and during periods of non-use.

6. The faucet as recited in claim 5, wherein said plunger has channels on its exterior surface for improved fluid circulation within said bore.

7. The faucet as recited in claim 1, further comprising a handle having a pivotal lever which terminates within said plunger, said lever being configured to drive said plunger to move axially within said bore upon pivotal movement of said lever.

8. The faucet as recited in claim 7, further comprising a pivot mount which pivotally supports said lever in said valve body and which includes first and second bushings disposed on opposite sides of a pivot point of said lever.

9. The faucet as recited in claim 8, further comprising a food-grade lubricant encapsulated between said first and second bushings.

10. The faucet as recited in claim 7, wherein said faucet is configured to dispense a liquid, and wherein said plunger has passages formed therethrough which are configured to permit an interface between said plunger and said lever to be washed with liquid flowing through said plunger.

11. The faucet as recited in claim 7, wherein said faucet is configured to dispense a particulate-laden fluid, and further comprising a guard that seals an interface between said plunger and said lever from the fluid while permitting relative movement therebetween.

12. The faucet as recited in claim 1, wherein said tip is substantially shaped to decrease in diameter from an upstream portion to a downstream portion.

13. The faucet as recited in claim 1, wherein said valve seal is comprised of a food-grade elastomer having the ability to deform both axially and radially against said seat.

14. The faucet as recited in claim 13, wherein said valve seal comprises an annular rib, and wherein said valve seal scrapes past said rib as said plunger moves between said valve-open position and said valve-closed position.

15. The faucet as recited in claim 12, wherein the location of said annular rib is between the plunger and the plunger tip.

16. The faucet as recited in claim 1, wherein said flow modifying tip has an upstream end attached to said plunger and a downstream end that extends beyond said outlet port both when said plunger is in said valve open position and said valve closed position.

17. The faucet as recited in claim 16, wherein said upstream end of said tip is integral with said plunger.

18. The faucet as recited in claim 16, wherein said tip has a larger diameter at said upstream end and a smaller diameter at said downstream end.

19. The faucet as recited in claim 16, wherein said tip is substantially conical.

20. The faucet as recited in claim 19, wherein said plunger extends at least generally horizontally, said spigot extends downwardly from said valve body, and said downstream end of said tip is positioned above an inlet of said spigot.

21. The faucet as recited in claim 16, wherein said tip is substantially cylindrical.

22. The faucet as recited in claim 16, wherein tip has a flange at said upstream end and is conical at said downstream end.

23. The faucet as recited in claim 16, wherein said tip is substantially bulbous.

24. A faucet configured to dispense a particulate-laden fluid comprising:

(A) a valve body having a bore, an inlet port, an outlet port, and a seat disposed adjacent said outlet port;

(B) a plunger disposed in said valve body between said inlet port and said outlet port, wherein said plunger has a first, upstream end and a second, downstream end;

is moveable axially within said bore in a direction parallel to fluid flow, from a valve-open position to a valve-closed position;

has a flow modifying tip on its downstream end; and has a radial socket that receives a pivotal lever;

(C) a valve seal disposed adjacent to said downstream end of said plunger, wherein said seal seals against said seat when said plunger is in said valve-closed position;

(D) a handle connected with said pivotal lever which terminates within said plunger, said lever being configured to drive said plunger to move axially within said bore upon pivotal movement of said lever; and (E) a guard that seals an interface between said plunger and said lever from the fluid while permitting relative movement therebetween, wherein said guard comprises an elastomeric boot seal that extends into said socket from a peripheral surface of said bore and that encases a terminal end of said lever.

25. A faucet for a pressurized material dispenser, comprising:

(A) a valve body having an inlet port, an outlet port, a first bore extending axially from said inlet port to said outlet port, a seat disposed adjacent said outlet port, and a second bore opening radially into said first bore between said inlet port and said outlet port;

(B) a plunger disposed in said first bore between said inlet port and said outlet port, said plunger having a socket formed therein;

(C) a valve seal which is provided on said plunger, which is disposed entirely within said first bore when said plunger is in a valve-open position, and which seals against said seat when said plunger is in a valve-closed position;

(D) a handle having a pivotal lever which extends through said second bore and into said first bore to terminate within said plunger, said lever being configured to drive said plunger to move axially within said first bore upon movement of said handle; and (E) a guard that seals an interface between said plunger and said lever from the fluid while permitting relative pivoting movement between said lever and said plunger, wherein said guard comprises an elastomeric boot seal that extends into said socket from said second bore and that encases a terminal end of said lever.

26. The faucet as recited in claim 21, further comprising a pivot mount in said second bore which supports said lever in said second bore and which includes first and second bushings disposed on opposite sides of a ball on said lever.

27. The faucet as recited in claim 26, further comprising a food-grade anti-bacterial lubricant that is encapsulated between said first and second bushings.

28. A method of operating a faucet for a pressurized dispenser, said method comprising the steps of:

(A) dispensing a carbonated fluid through a spigot by transmitting a first, pulling-forward force from a handle to a plunger of a valve within a bore of a valve body, thereby pulling a seal associated with said plunger out of connection with a seat of said valve and permitting said fluid to flow past said seat, then over a flow modifying tip, and then out of said spigot, wherein the flow over the fluid modifying tip prevents $CO_2$ from separating from the fluid before the fluid is discharged from said spigot; and (B) ceasing dispensing by transmitting a second, opposite force from said handle to said plunger, thereby pushing said seal into a sealing connection with said valve seat to close said valve.

29. The method as recited in claim 28, further comprising the step of immersing said plunger in fluid within said bore during both the steps of dispensing and ceasing dispensing.

30. The method as recited in claim 28, further comprising the step of rinsing the interior of said plunger and an interface between said plunger and a lever of said handle during the dispensing step.

31. The method as recited in claim 28, further comprising the step of cleaning said faucet by closing said valve and swabbing the seal clean of contaminants.

32. The method as recited in claim 28, wherein the step of permitting said fluid to flow past said seat and out of said spigot includes the step of requiring the fluid to flow over a tapered tip provided on said plunger that extends past said seat when said valve is fully-open.

* * * * *